United States Patent Office 3,520,867
Patented July 21, 1970

3,520,867
PROCESS FOR THE POLYMERIZATION OF VINYL CHLORIDE
Sergio Lo Monaco and Corrado Mazzolini, Mestre, and Luigi Patron and Alberto Moretti, Venice, Italy, assignors to Chatillon Societa Anonima Italiana per le Fibre Tessili Artificiali S.p.A., Milan, Italy, a corporation of Italy
No Drawing. Filed Sept. 28, 1967, Ser. No. 671,223
Int. Cl. C08f 3/30
U.S. Cl. 260—92.8            9 Claims

ABSTRACT OF THE DISCLOSURE

Process for bulk-polymerizing vinyl chloride at a temperature below 0° C. (preferably from —10° to —70° C.) in the presence of a catalytic system consisting of: (a) from 0.05% to 3% by weight, referred to the monomeric system, of an organic hydroperoxide of general formula R—O—O—H wherein R is a linear or branched chain alkyl radical, a cycloalkyl radical, an aryl radical or an alkyl-aryl radical (preferably cumene hydroperoxide and tert. butyl-hydroperoxide), (b) up to 0.5% by weight referred to the monomeric system, of sulphur dioxide and in which the molar ratio sulphur dioxide/organic hydroperoxide is comprised between 1:15 and 15:1, and (c) from 0.1% to 10% by weight, referred to the monomeric system, of a saturated aliphatic mono- or dihydroxy alcohol having from 1 to 6 carbon atoms.

BACKGROUND OF THE INVENTION

This invention relates to a process for the low temperature bulk-polymerization of vinyl chloride alone or in admixture with up to 20% of another ethylenically unsaturated monomer.

It is known that the low temperature polymerization of vinyl chloride results in the formation of polyvinyl chloride which exhibits particular characteristics such as a greater percentage of crystallinity associated to a high index of syndiotacticity, a higher second order transition temperature, a higher softening temperature etc. Such polyvinylchloride, usually called highly syndiotactic polyvinyl chloride, is particularly suitable to be transformed into fibres having excellent physical, mechanical and chemical characteristics.

However, the low temperature polymerization of vinyl chloride, practically, involves serious difficulties as far as the polymerization process and the catalyst are concerned. In fact, the only polymerization process which can be easily carried out at low temperature is the bulk-polymerization, because the other known polymerization processes, that is emulsion or solution process, involve many inconveniences such as the choice of a suitable solvent or emulsifying agent, the necessity to use voluminous polymerization equipment and great volumes of reacting compounds for obtaining an industrially interesting productivity, high costs for bringing the polymerization mixture down to a low temperature, etc. As to the catalyst, the usually polymerization initiators like organic peroxides, azo-bis-isobutirro-nitrile, persulphates, etc. are ineffective in the low temperature polymerization of vinyl chloride, because they are stable and do not produce the free radicals required to start polymerization.

It is known that the Redox catalyst system constituted by an organic hydroperoxide and sulphur dioxide is capable to form free radicals and to start the low temperature polymerization of sulphur dioxide with organic compounds having olefinic unsaturation or the solution polymerization of acrylonitrile. However, it is proved that such Redox catalyst system is ineffective in the low temperature bulk-polymerization of the vinyl chloride. In fact, it is proved that, when the vinyl chloride as reaction medium is used, the sulphur dioxide catalyzes the acid decomposition of the hydroperoxide without the free radical formation; such as, for example, cumene hydroperoxide in vinyl chloride monomer at —30° C., is quantitatively and nearly immediately decomposed in acetone and phenol, while the sulphur dioxide remain unvaried.

The only catalysts which so far have proved efficient in starting the bulk-polymerization at low temperature of the vinyl chloride are the organo-metal compounds, such as alkyl-zinc; alkyl-cadmium; alkyl-aluminium, alkyl-boron and the like, in association with molecular oxygen or with oxidizing substances. However, the use of such catalysts gives rise in practice to several drawbacks. For example, such catalysts are self-inflammable when in contact with the air, they are difficult to synthetize and very instable. Furthermore, they are very oxygen sensitive inasmuch as slightest oxygen traces, not checked during the polymerization, cause great variations in the polymerization conversion and in the viscosity of the polymer. Furthermore, the decomposition products of said catalysts, at room temperature or at higher temperature, prove to be still excellent polymerization initiators; consequently the unreacted recovered monomers, containing the decomposition products of said catalysts, tend to polymerize during its recovering and storage. Therefore the problem arises of completely eliminating from the unreacted monomers those decomposition products. A primary object of this invention is, therefore, to provide an advantageous and reliable process for low temperature bulk-polymerization of vinyl chloride, in which the above recalled drawbacks are avoided.

THE INVENTION

It has been surprisingly found that such drawbacks can be avoided by bulk-polymerizing, at a temperature below 0° C., vinyl chloride in the presence of a catalytic system essentially consisting of:

(a) From 0.05% to 3% by weight, referred to the monomeric system, of an organic hydroperoxide;

(b) Up to 0.5% by weight, referred to the monomeric system, of sulphur dioxide and in which the molar ratio sulphur dioxide/organic hydroperoxide is comprised between 1:15 and 15:1 and (c) From 0.1% to 10% by weight, referred to the monomeric system, of a saturated aliphatic mono- or dihydroxy alcohol having from 1 to 6 carbon atoms.

It is pointed out that the strongly free radical polymerization initiators which start the low temperature bulk-polymerizaion of vinyl chloride are produced by the cooperation of the above cited three compounds of the catalytic system, that is an organic hydroperoxide, sulphur dioxide and an alcohol.

The simultaneous presence of these three compounds, therefore, is essential for carrying out the polymerization insofar as in the case that one of the three compounds is missing no polymerization would take place.

The organic hydroperoxide, as used herein, is an organic compound of the formula R—O—O—H, in which R is a linear or branched chain alkyl radical, a cycloalkyl, radical, an aryl radical or an alkyl-aryl radical.

Examples of such compounds are the hydroperoxides of methyl, ethyl, n-propyl, tert. butyl, n-butyl, amyl, hexyl, octyl, phenyl-ethyl, phenyl-isobutyl, phenyl-isopropyl. Particularly suitable are the cumene hydroperoxide and tert. butyl-hydroperoxide. It is to be expressly pointed out that, as distinct from the hydroperoxides above, organic peroxides of the general formula R—O—O—R are ineffective in the process of this invention.

The concentration of the organic hydroperoxide is not critical and, preferably, is comprised between 0.05 and 3% by weight with respect to the fed monomers.

The concentration of the sulphur dioxide must be such that the molar ratio sulphur dioxide/organic hydroperoxide is comprised between 1:15 and 15:1, however, in any case, its quantity must not be greater than 0.5% by weight with respect to the monomeric system, because it is proved that by using a quantity exceeding 0.5%, a polyvinyl chloride of low colour quality and exhibiting a low heat resistance is obtained.

Examples of saturated aliphatic mono- or di-hydroxy alcohols, which may be used in the process of this invention, are: methyl alcohol, ethyl alcohol, n-propyl alcohol, isopropyl alcohol, n-butyl alcohol, isobutyl alcohol, tert. butyl alcohol, n-amyl alcohol, isoamyl alcohol, tert. amyl alcohol, n-hexyl alcohol, glycol, propylene glycol, butylene glycol and the like. It is important that the alcohol is soluble in the monomeric system to be polymerized.

The polymerization temperature is below 0° C. and particularly comprised between —10° and —70° C. Such a temperature of the reaction mixture is maintained by conventional cooling means. By the term bulk-polymerization it must be understood not only the polymerization carried out by the catalytic system in the undiluted monomer, but also in the presence of minor quantity of non-reacting organic compounds, liquid at the polymerization temperature, having a diluting action on the polymerization slurry, to render it more free under agitation, and to facilitate the heat transfer through the reaction vessel. The following are suitable as diluting agents: saturated aliphatic hydrocarbons, aryl hydrocarbons, cycloalkyl hydrocarbons, saturated halogenated hydrocarbons etc. Among these compounds, halogenated saturated hydrocarbons such as ethyl chloride, methyl chloride, dichloroethane are preferred.

It is advisable to conduct the polymerization in the absence of oxygen which has an inhibiting effect on the polymerization. In general, for this purpose suitable inert gases, such as nitrogen or carbon dioxide, are used to displace the air from the polymerization reactor.

The process of this invention can be carried out, in practice, in both continuous, semi-continuous and batchwise mode of operation. In each case, sulphur dioxide and organic hydroperoxide are kept separated from each other until their introduction into the monomeric system in the reactor. The alcohol can be fed indifferently either with the sulphur dioxide or with the organic hydroperoxide, or alone.

The polymerization can be short-stopped at the desired molecular weight either by known radical inhibitors such as, for example, molecular oxygen, quinone and the like or by discharging the polymerization slurry into an aqueous alkaline solution having a pH of 9–12.

It is understood that the catalytic system and process of this invention can be as well applied to the copolymerization of vinyl chloride with up to 20% by weight of ethylenically unsaturated monomers copolymerizable with vinyl chloride. The only difference with respect to the process described above, is that the starting monomers are an admixture of vinyl chloride and one or more other copolymerizable ethylenically unsaturated monomers. By the term "ethylenically unsaturated monomers" are to be understood the organic compounds containing the group >C=C<. Examples of these compounds are: vinylidene or vinyl compounds, such as vinylidene chloride or fluoride, vinyl fluoride; vinyl esters of carboxylic aliphatic acid containing from 2 to 18 carbon atoms, such as for instance, the vinyl esters of the acetic acid, or the propionic acid, etc.; the acrylic-type monomers, such as acrylic acid, methacrylic acid or their derivatives, as for instance, acrylonitrile, acrylate or methacrylate of aliphatic alcohols containing from 2 to 12 carbon atoms.

According to the process of this invention vinyl chloride polymers or copolymers are obtained having a high second order transition temperature, a high syndiotactic index, a high softening point, a small heat-shrinkage of the films or fibres obtained from them. Moreover they have sulphonic aci dend groups which make the polymers or copolymers particularly susceptible to being treated with cationic-active substances.

In order to further illustrate this invention, but without being limited thereto, the following examples are given:

EXAMPLE NO. 1

Into a 2 litre polymerization glass reactor fitted with a stirrer, a refrigeration system and a thermometer, were fed in continuously 400 g./hr. of vinyl chloride, an organic hydroperoxide, sulphur dioxide and an alcohol of the type recorded on Table I. The polymerization reactor was maintained at —30° C. by means of a thermostatic bath.

From a overflow pipe the polymer suspension thus obtained was continuously discharged into an aqueous solution of NaOH having a pH of 10, from which the polymer was separated. The polymer was then centrifuged and dried.

On Table I are recorded: the type and quantity of the fed hydroperoxide, the quantity of fed sulphur dioxide, the type and the quantity of the alcohol fed in and the mean molecular weight of the polymer obtained.

The mean molecular weight was determined on the basis of the intrinsic viscosity value $(\eta)$, determined in cyclohexanone at 30° C., according to the equation:

$$(\eta) = 2.4 \times 10^{-4} \times M^{0.77}$$

where "M" represents the mean molecular weight and $(\eta)$ represents the intrinsic viscosity expressed in dl./g.

TABLE I

| Hydroxyperoxide | Quantity of hydroxyperoxide fed in g./h. | Sulphur dioxide fed in g./h. | Molar ratio sulphur dioxide/hydroperoxide | Alcohol type | Quantity in g./h. | Conversion per hour in percent | Mean molecular weight |
|---|---|---|---|---|---|---|---|
| Cumene hydroperoxide | 0.6 | 0.25 | 1 | | | 0 | |
| Do | 0.4 | 0.84 | 5 | | | 0 | |
| Do | 0.6 | 0.25 | 1 | Methyl alcohol | 20 | 3.2 | 65,000 |
| Do | 0.4 | 0.84 | 5 | do | 10 | 3.8 | 72,000 |
| Do | 0.5 | 0.63 | 3 | propyl alcohol | 8 | 4.2 | 72,000 |
| Tertiary butyl hydroperoxide | 0.48 | 0.68 | 2 | | | 0 | |
| Do | 0.48 | 0.68 | 2 | Methyl alcohol | 4 | 3.9 | 70,000 |
| Do | 0.32 | 1.13 | 5 | Ethyl alcohol | 8 | 4.2 | 92,000 |

EXAMPLE NO. 2

By operating according to Example No. 1, and maintaining the polymerization reactor at —20° C., by means of a thermostatic bath, were fed in continuously 400 g./hr. of vinyl chloride
0.4 g./hr. of cumene hydroperoxide
1.68 g./hr. of sulphur dioxide
4 g./hr. of methyl alcohol.

The molar ratio sulphur dioxide/hydroperoxide was 10. The conversion per hour in percent was 6.5 and the polymer had a molecular weight of 78,000.

EXAMPLE NO. 3

To 2000 g. of vinyl chloride and to 400 g. of ethylchloride cooled down to —30° C. and maintained at this temperature by a thermostatic bath, were added, in 60 minutes and under stirring, 3 g. of cumene hydroperoxide; 3.11 g. of sulphur dioxide (sulphur dioxide/cumene hydroperoxide ratio 2.5) and 50 g. of ethylene glycol. The polymerization started immediately and the polymer thus formed progressively precipitated. After about 120 minutes the stirring was stopped and the polymer was separated by pouring the reaction mass into an aqueous solution of NaOH having a pH 9.5. The polymer was washed with water and dried at 50–70° C. 122 g. of polyvinyl chloride having a molecular weight of 64,000 were obtained.

What we claim is:

1. A process for bulk-polymerizing vinyl chloride at a temperature below 0° C. and down to −70° C., characterized in that the polymerization is carried out in the presence of a catalytic system essentially consisting of:
    (a) from 0.05% to 3% by weight, referred to the monomeric system, of an organic hydroperoxide;
    (b) up to 0.5% by weight, referred to the monomeric system, of sulphur dioxide and in which the molar ratio sulphur dioxide/organic hydroperoxide is between 1:15 and 15:1, and
    (c) from 0.1% to 10% by weight, referred to the monomeric system of a saturated aliphatic mono- or di-hydroxy alcohol having from 1 to 6 carbon atoms.

2. A process according to claim 1, characterized in that a saturated aliphatic mono-hydroxy alcohol is used.

3. A process according to claim 2, characterized in that the saturated aliphatic mono-hydroxy alcohol is methyl or ethyl or propyl alcohol.

4. A process according to claim 1, characterized in that a saturated aliphatic di-hydroxy alcohol is used.

5. A process according to claim 4, characterized in that the saturated aliphatic di-hydroxy alcohol is ethylene glycol.

6. A process according to claim 1, characterized in that, as organic hydroperoxide, cumene hydroperoxide is used.

7. A process according to claim 1, characterized in that, as organic hydroperoxide, tertiary-butyl-hydroperoxide is used.

8. A process according to claim 1, characterized in that the polymerization is carried out in the presence of a minor quantity of nonreacting organic compounds, preferably in the presence of a saturated halogenated hydrocarbon selected from the group consisting of ethyl chloride, methyl chloride and dichloroethane.

9. A process according to claim 1, characterized in that the vinyl chloride is copolymerized with up to 20% of one or more other copolymerizable ethylenically unsaturated monomers.

References Cited

UNITED STATES PATENTS

| | | | |
|---|---|---|---|
| 3,255,164 | 6/1966 | Visger et al. | 260—86.3 |
| 3,294,770 | 12/1966 | Ragazzini et al. | 260—92.8 |
| 3,372,219 | 3/1968 | Gord et al. | 260—92.8 |
| 3,415,797 | 12/1968 | Borsini et al. | 260—92.8 |

JAMES A. SEIDLECK, Primary Examiner

U.S. Cl. X.R.

260—85.5, 86.3, 87.1, 87.5, 87.7